United States Patent [19]

Youngren et al.

[11] Patent Number: 4,875,760
[45] Date of Patent: Oct. 24, 1989

[54] REFLECTIVE PRISM ASSEMBLY

[76] Inventors: John H. Youngren; David J. Youngren, both of 4516 Abbott Ave., Robbinsdale North, Minn. 55422

[21] Appl. No.: 193,892

[22] Filed: May 13, 1988

[51] Int. Cl.$^4$ .......................... G02B 5/122; G02B 7/18
[52] U.S. Cl. .................................... 350/102; 350/287; 33/293
[58] Field of Search ................. 350/97, 102, 286, 287, 350/107, 108; 356/247, 255; 33/125 R, 125 A, 293, 700, 707

[56] References Cited

U.S. PATENT DOCUMENTS 2,099,671 11/1937 Bairey .................................... 350/97
3,322,022 5/1967 Wood .................................... 350/286
3,834,789 9/1974 Brody .................................... 350/97
4,519,674 5/1985 Buckley ............................ 350/287

Primary Examiner—Bruce Y. Arnold
Assistant Examiner—Ronald M. Kachmarik
Attorney, Agent, or Firm—Connolly and Hutz

[57] ABSTRACT

A 360° reflective prism assembly comprises a mounting member having a central vertical axis and a peripheral surface portion that defines an outer horizontal boundary of the mounting member. A plurality of spaced apart reflecting prisms are arranged around the mounting member and attached thereto at or near the peripheral surface portion thereof. The prism assembly is used with electronic distance meters for measuring the distance between the assembly and meter locations surround the assembly.

18 Claims, 2 Drawing Sheets

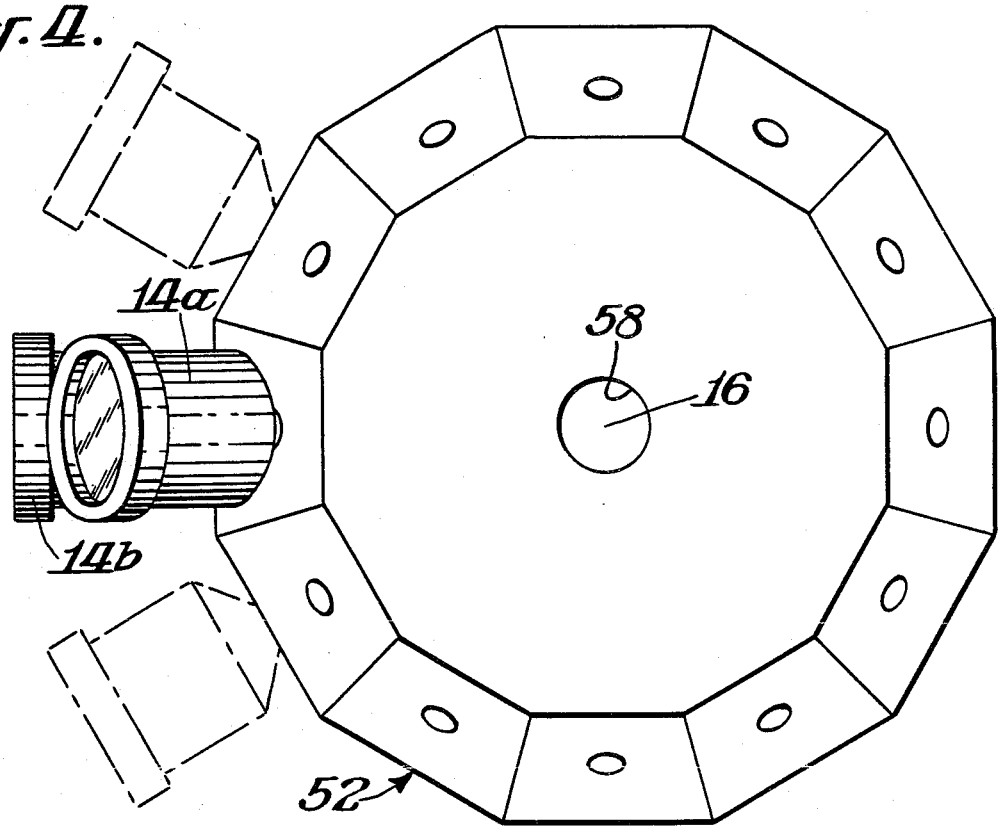
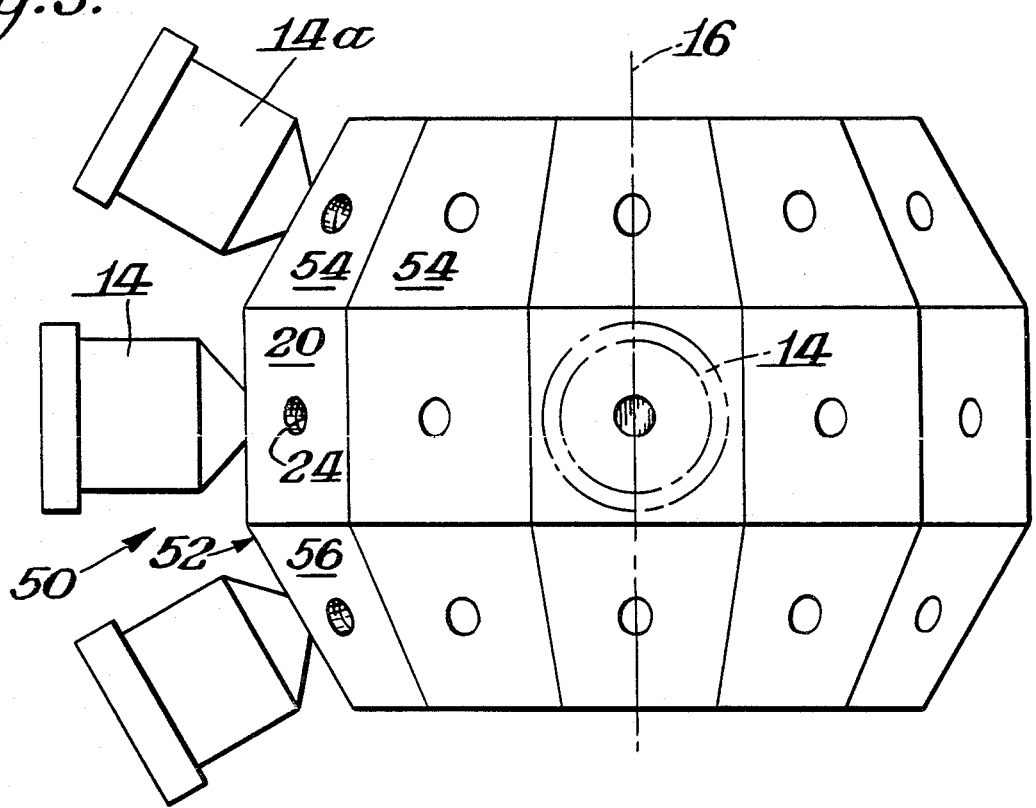

4,875,760

REFLECTIVE PRISM ASSEMBLY

BACKGROUND OF THE INVENTION

The present invention generally relates to distance measuring equipment for topographic surveying, and more particularly to a horizontally oriented 360° reflective prism assembly for use with electronic distance meters of the type that direct electronic infrared or laser beams or the like onto the prism assembly for measuring the distance between the meter and assembly.

In topographic surveying, an electronic distance meter is aimed at a distantly located reflector in order to measure the distance between the meter and reflector. Most remotely located reflectors utilize a prism or cluster of prisms to reflect incident infrared or laser energy from the distance meter along a colinear return path back to the meter. In this manner, the distance between these elements is accurately determined. However, while the heretofore proposed reflectors often utilize a cluster of prisms, these prisms are oriented in one direction only. This requires that a person be positioned next to the prism or prism cluster to turn them toward the electronic distance meter in order to properly reflect the beam back to the meter. Not only do these reflector arrangements require constant attention, but they only allow a single survey crew to use the reflector at any one point in time.

SUMMARY OF THE INVENTION

Accordingly, it is an object of the present invention to avoid the disadvantages of the prior art by providing a horizontally disposed 360° reflective prism assembly that functions to reflect incident energy directed onto the assembly from an infinite number of radially outward positions encircling the assembly.

Another object of the present invention is a horizontally disposed 360° reflective prism assembly which is simple in design and construction but which functions in a highly effective manner to reflect incident energy directed onto the assembly from an infinite number of radially outward positions encircling the assembly.

Still another object of the present invention is a horizontally disposed 360° prism assembly which functions in a highly efficient manner to reflect incident energy directed onto the assembly even when the energy beams are directed from extreme variations in elevation relative to the assembly.

In accordance with the present invention, a 360° reflective prism assembly comprises a mounting member having a central vertical axis and a peripheral surface portion defining an outer horizontal boundary of the mounting member. A plurality of spaced apart reflecting prisms are arranged around the mounting member and attached thereto at or near the peripheral surface portion thereof.

Preferably the plurality of prisms are equally spaced apart around the peripheral surface portion of the mounting member. Moreover, the mounting member may be generally plate-like in configuration with the peripheral surface portion thereof defining the outer horizontal boundary of the member. In the preferred embodiment, the plate-like mounting member includes a plurality of flat vertical faces each of which is equally spaced from the central vertical axis of the mounting member. Twelve flat faces are equally angularly spaced from each other around the mounting member, and a reflecting prism is attached to each face.

Each reflecting prism may be attached to its respective flat faces at the center thereof. Also, it is preferred that the reflecting prisms be releasably attached to the flat faces. Each prism includes an externally threaded stud, and internally threaded openings are constructed and arranged in the mounting member for receiving the studs.

The 360° reflective prism assembly of the present invention may also include a second plurality of spaced apart reflecting prisms arranged around the mounting member and attached thereto at or near the peripheral surface portion thereof either above or below the first plurality of prisms. Both prism pluralities are attached at or near the peripheral surface portion of the mounting member and the individual prisms of each plurality are equally spaced apart around the mounting member.

Upper and lower tiers of reflecting prisms may be provided for reflecting energy beams directed from positions having extreme elevational differences relative to the prism assembly. Preferably, the upper tier of reflecting prisms are attached to a plurality of flat faces which extend upwardly and which are inwardly angled from the first plurality of flat vertical faces. Similarly, the lower tier of reflecting prisms are attached to a lower plurality of flat faces which extend downwardly and which are inwardly angled from the first plurality of flat vertical faces. Twelve reflecting prisms may be associated with each tier thereby providing a 360° reflective prism assembly having thirty-six prisms. Each of the reflecting prisms is preferably attached to its respective flat face at the center thereof, and such attachment is preferably of a releasable nature.

BRIEF DESCRIPTION OF THE DRAWING

Novel features and advantages of the present invention in addition to those noted above will become apparent to those of ordinary skill of the art from a reading of the following detailed description in conjunction with the accompanying drawing wherein similar reference characters refer to similar parts and in which:

FIG. 3 is a side elevational view of another reflective prism assembly, according to the present invention; and FIG. 4 is a top plan view of the reflective prism assembly shown in FIG. 3.

DETAILED DESCRIPTION OF THE INVENTION

Figure 1:
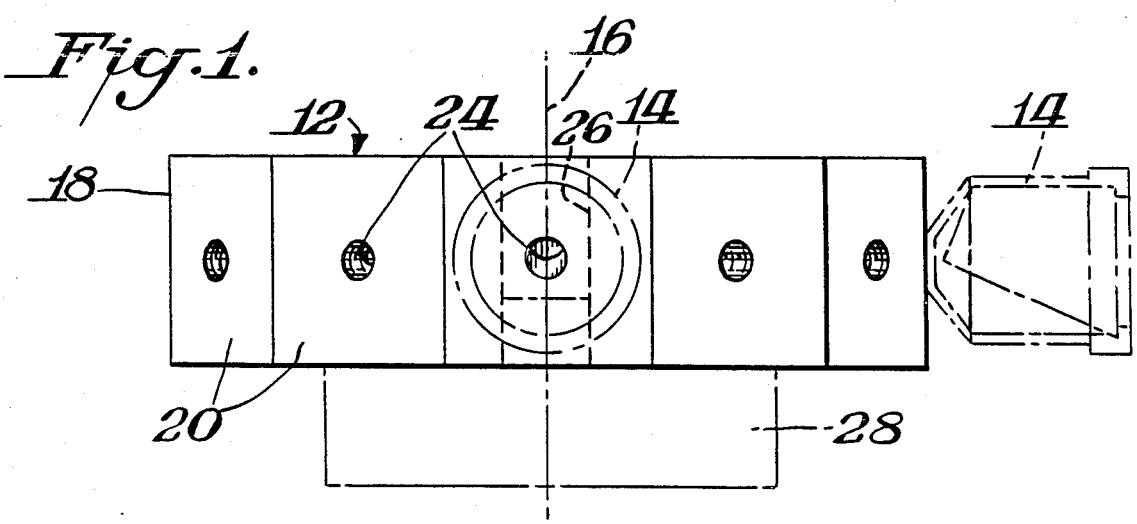
FIG. 1 is a side elevational view of a reflective prism assembly, according to the present invention.

Referring in more particularity to the drawing, FIG. 1 illustrates a 360° reflective prism assembly 10 comprising a mounting member 12 and a plurality of spaced apart reflecting prisms 14. The mounting member has a central vertical axis 16 and a peripheral surface portion 18 that defines the outer horizontal boundary of the mounting member. The spaced apart reflecting prisms 14 are arranged around mounting member 12 and attached thereto at the peripheral surface portion 18.

The specific details of the reflecting prisms 14 do not form part of the present invention and a wide variety of commercially available prisms may be used with the mounting member 12 to produce a reflective prism assembly according to the present invention. Several prisms are illustrated and described in U.S. Pat. No.

4,519,674 and these prisms may be used with mounting member 12 to produce reflective prism assembly 10. Any reflective prism may be utilized if the prism has the capability of reflecting incident infrared or laser energy from an electronic distance meter along a colinear return path back to the meter. As is well known in the art, this technology is utilized to measure the distance between the location of the electronic distance meter and the reflective prism.

As best shown in FIG. 1, the plurality of prisms 14 are equally spaced apart around the peripheral surface portion 18 of the mounting member. Moreover, while the mounting member may be formed in a variety of different configurations, the preferred embodiment is a generally plate-like member and the peripheral surface portion of the plate-like member defines the outer horizontal boundary thereof. Preferably, such peripheral surface portion 18 includes a plurality of similarly shaped flat vertical faces 20 each of which is equally spaced from the central vertical axis 16 of the mounting member 12.

In the preferred embodiment of the present invention, the plurality of flat vertical faces 20 includes at least ten faces equally angularly spaced from each other around the mounting member, and a reflecting prism 14 is attached to each face. Most preferred is a plurality of flat vertical faces 20 comprising twelve in number, equally angularly spaced from each other around the mounting member with a reflecting prism 14 attached to each face.

Figure 2:
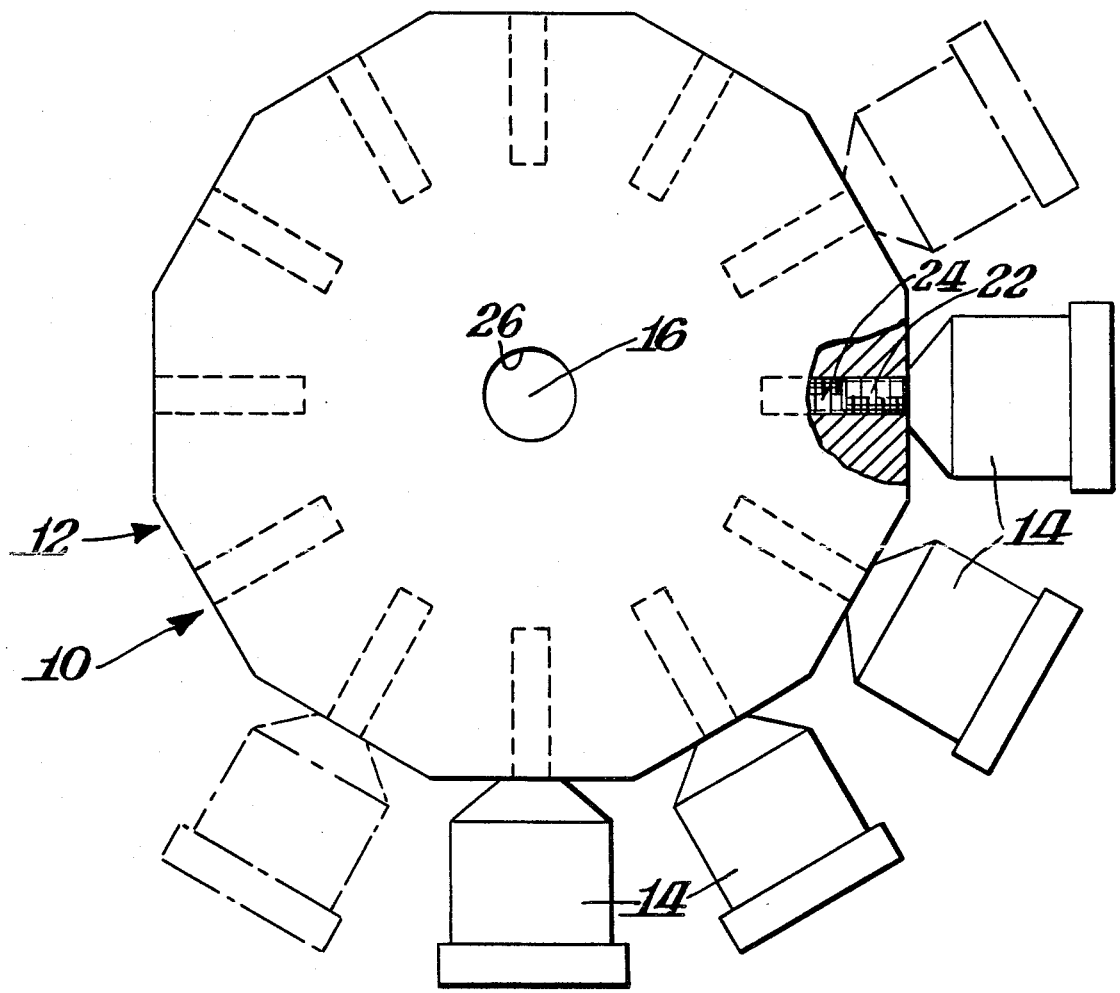
FIG. 2 is a top plan view of the reflective prism assembly shown in FIG. 1.

FIGS. 1 and 2 illustrate that the reflecting prisms 14 are releasably attached to their respective flat faces 20. Specifically, each reflecting prism includes an externally threaded stud 22 at the rear of the prism, and the mounting member includes internally threaded bore holes or openings 24 constructed and arranged to receive the studs 22. The openings 24 are preferably located at the center of each of the flat faces 20 comprising the peripheral surface portion 18 of mounting member 12.

The mounting member 12 includes attaching means for securing it to a support stand or tripod 28. In the embodiment of the invention shown in FIGS. 1 and 2, such attaching means is in the form of an internally threaded central bore hole 26 which cooperates with mating structure on the support stand or tripod used to support the reflective prism assembly 10.

A modified reflective prism assembly 50 is shown in FIGS. 3 and 4 of the drawing wherein additional reflecting prisms 14a and 14b are releasably attached to a modified mounting member 52. As explained more fully below, assembly 50 is particularly useful for measuring distances from locations having elevations which are different from the elevation of the prism assembly. When the angle of horizontal deviation or azimuth between the assembly and the electronic distance meter is significant, the particular assembly 50 shown in FIGS. 3 and 4 is utilized to make the desired distance readings. Moreover, assembly 50 is similar in many respects to assembly 10 and similar reference characters are utilized to identify similar parts.

Reflective prism assembly 50 includes an upper and lower plurality of spaced apart reflecting prisms, 14a and 14b, respectively. The upper prisms 14a are arranged around the mounting member 52 directly above the prisms 14 while the lower prisms 14b are arranged around mounting member 52 directly below the prisms 14. In each instance, both the upper and lower plurality of prisms are equally spaced apart in the horizontal direction, and this arrangement functions to position one reflecting prism from each tier of prisms in vertical alignment with the others.

In addition to the flat vertical faces 20, the peripheral surface portion of the mounting member 52 includes an upper plurality of flat faces 54 extending upwardly and inwardly angled from the flat vertical faces 20. Similarly, the peripheral surface portion of mounting member 52 includes a lower plurality of flat faces 56 extending downwardly and inwardly angled from the flat vertical faces 20. The faces 54 of the upper plurality and the faces 56 of the lower plurality are equally spaced from the central vertical axis 16 of the mounting member 52. In the preferred embodiment of the invention, the flat faces 54 and 56 are angled 30° relative to the vertical.

Both the upper and lower flat faces 54 and 56 include twelve such faces, and these faces are equally angularly spaced from one another around mounting member 52. A reflecting prism is attached to each face and the attachment may be releasable in the same manner as described above in connection with reflecting prisms 14 and their attachment to flat vertical faces 20. Also, the 360° reflective prism assembly 50 includes attaching means 58 at the center thereof for releasably securing the mounting member to a suitable support stand or tripod (not shown). In the preferred embodiment, such attaching means may comprise an internally threaded bore hole 58 at least near the upper and lower surfaces of the mounting member.

In topographic surveying, either of the reflective prism assemblies 10 or 50 may be supported in a generally horizontal plane at the center of the survey site so that the reflecting prisms are positioned around the mounting member of the assembly. With the 360° reflective prism assembly of the present invention, at least one prism on the mounting member is facing an electronic distance meter at all times regardless of the location of the meter thus eliminating the need of a person near the assembly to turn the prism toward the meter. With the assembly centrally placed, multiple survey crews may use the assembly at the same time thereby saving time and money. Moreover, the reflective prism assembly may be attached to buildings under construction or any other type of stable structure, a range plumbing pole or a tripod with a tribrach and tribrach adapter to center the assembly over the point. With these latter supports, the assembly may be moved about as needed.

Reflective prism assembly 10 with twelve prisms 14 functions very well for most applications. However, modified assembly 50 is used where there are extreme variations in elevation of the land surrounding the assembly.

Most topographic surveying in this country is done in tenths or hundreths of a foot (in Canada and most other countries it is metric). Some of the smaller excavating contractors in this country use feet and inches. The offset distance from the base of the prism to the peripheral surface portion of the mounting member varies with each manufacturer's prism and is stated in millimeters. Therefore, the distance from the central vertical axis 16 to the prism base would be 144 millimeters÷2=72 mm; 72 mm+offset distance of the prism used, would be the amount to be entered into the computer. This amount is entered into the computer memory as a correction factor whenever a measurement is taken. Other variations of this general scheme are also possible. For example the distance across the mounting member may be 300 mm with a correction factor of 150 mm+offset distance of the prism used.

The infrared or laser beam must not hit the front of the reflecting prism at an angle of greater than 20° or a reading may not be returned to the electronic distance meter. Using ten equally spaced apart reflecting prisms only allows a few degrees of error. If the prism should happen to be bumped and shifted during installation, an angle of greater than 20° could be formed for the return of the infrared or laser beam and no signal from either adjacent prism. Hence, a twelve prism mounting member is the most preferred arrangement.

What is claimed is:

1. A 360° reflective prism assembly comprising a generally plate-like mounting member having a central vertical axis and a peripheral surface portion defining an outer horizontal boundary of the mounting member, the peripheral surface portion of the plate-like mounting member including at least ten flat vertical faces equally angularly spaced from each other around the mounting member, and a plurality of equally spaced apart reflecting prisms arranged around the mounting member, one prism releasably attached to each flat face.

2. A 360° reflective prism as in claim 1 wherein each of the reflecting prisms includes an externally threaded stud, and internally threaded openings in the mounting member constructed and arranged to receive the studs.

3. A 360° reflective prism assembly as in claim 1 wherein each of the reflecting prisms is attached to its respective flat face at the center thereof.

4. A 360° reflective prism assembly as in claim 1 wherein the mounting member includes means for attaching it to a support stand.

5. A 360° reflective prism assembly comprising a generally plate-like mounting member having a central vertical axis and a peripheral surface portion defining an outer horizontal boundary of the mounting member, the peripheral surface portion of the plate-like mounting member including a first plurality of flat vertical faces each of which is equally spaced from the central vertical axis of the mounting member, an upper plurality of flat faces extending upwardly and inwardly angled from the first plurality of flat vertical faces, each face of the upper plurality being equally spaced from the vertical axis, a lower plurality of flat faces extending downwardly and inwardly angled from the first plurality of flat vertical faces, each face of the lower plurality being equally spaced from the vertical axis, and a plurality of reflecting prisms arranged around the mounting member, one prism attached to each flat face.

6. A 360° reflective prism assembly as in claim 5 wherein each plurality of flat faces comprises ten faces equally angularly spaced from each other around the peripheral surface portion of the mounting member, and a reflecting prism attached to each face.

7. A 360° reflective prism assembly as in claim 6 wherein each of the reflecting prisms is releasably attached to its respective flat face.

8. A 360° reflective prism assembly as in claim 7 wherein each of the reflecting prisms includes an externally threaded stud, and internally threaded openings in the mounting member constructed and arranged to receive the studs.

9. A 360° reflective prism assembly as in claim 6 wherein each of the reflecting prisms is attached to its respective flat face at the center thereof.

10. A 360° reflective prism assembly as in claim 6 wherein the mounting member includes means for attaching it to a support stand.

11. A 360° reflective prism comprising a mounting member having a central vertical axis and a peripheral surface portion defining an outer horizontal boundary of the mounting member, the peripheral surface portion including a plurality of vertical faces equally angularly spaced from each other and equally spaced from the central vertical axis of the mounting member, and a plurality of equally spaced apart reflecting prisms arranged around the mounting member, with one prism attached to each face.

12. A 360° reflective prism assembly as in claim 11 wherein each of the reflecting prisms is releasably attached to its respective face.

13. A 360° reflective prism assembly as in claim 11 wherein each of the reflecting prisms is attached to its respective face at the center thereof.

14. A 260° reflective prism assembly as in claim 11 wherein the mounting member includes means for attaching it to a support stand.

15. A 360° reflective prism assembly as in claim 11 wherein the peripheral surface portion further includes an upper plurality of faces equally angularly spaced from each other and equally spaced from the central axis of the mounting member extending upwardly and inwardly angled relative to the plurality of vertical faces, and a lower plurality of faces equally angularly spaced from each other and equally spaced from the central axis of the mounting member extending downwardly and inwardly angled relative to the plurality of vertical faces, and wherein one prism is attached to each face.

16. A 360° reflective prism assembly as in claim 15 wherein each of the reflecting prisms is releasably attached to its respective face.

17. A 360° reflective prism assembly as in claim 15 wherein each of the reflecting prisms is attached to its respective face at the center thereof.

18. A 360° reflective prism assembly as in claim 15 wherein the mounting member includes means for attaching it to a support stand.

* * * * *

UNITED STATES PATENT OFFICE
CERTIFICATE OF CORRECTION

PATENT NO. : 4,875,760
DATED : October 24, 1989
INVENTOR(S) : John H. Youngren et al It is certified that error appears in the above-identified patent and that said Letters Patent is hereby corrected as shown below:

In column 6, line 33, in claim 14, correct "260°" to read -- 360° --.

Signed and Sealed this

Fifteenth Day of January, 1991

Attest:

HARRY F. MANBECK, JR.

Attesting Officer     Commissioner of Patents and Trademarks